United States Patent

Le Strat et al.

[15] 3,673,333

[45] June 27, 1972

[54] ACCOUNTING SYSTEM FOR TELEPHONIC EXCHANGES

[72] Inventors: Guy Jean Le Strat, Lannion; Roger Desplanques, Velizy, both of France

[73] Assignee: International Standard Electric Corporation, New York, N.Y.

[22] Filed: Dec. 17, 1969

[21] Appl. No.: 885,822

[30] Foreign Application Priority Data

Dec. 18, 1968 France ................................68178920

[52] U.S. Cl. ............................................................179/7 R

[51] Int. Cl. ..........................................................H04m 15/06

[58] Field of Search ........................179/7 MM, 7.1, 7, 7.1 TP

[56] References Cited

UNITED STATES PATENTS

| | | | |
|---|---|---|---|
| 3,160,709 | 12/1964 | Burke | 179/7 MM |
| 3,001,021 | 9/1961 | Wright et al. | 179/7 MM |
| 3,283,078 | 11/1966 | Avery | 179/9 |

*Primary Examiner*—William C. Cooper
*Assistant Examiner*—Tom D'Amico
*Attorney*—C. Cornell Remsen, Jr., Walter J. Baum, Percy P. Lantzy, J. Warren Whitesel, Delbert P. Warner, James B. Raden and Marvin Chaban

[57] ABSTRACT

An automatic toll ticketing system provides means for transfering charge information from registers, incoming links and a rate of charge indicator, to a programmed data-processing machine. In case where the transfer is not possible, a second attempt is made, and if insuccessful, a fault signal is provided and busy tone is sent to the subscriber.

4 Claims, 5 Drawing Figures

ACCOUNTING SYSTEM FOR TELEPHONIC EXCHANGES

The present invention relates to toll ticketing systems designed for accounting in automatic telephonic exchanges. More specially, it relates to variable accounting (according to duration, distance etc.) used in toll communications.

A well-known way of toll ticketing is to record the number of fixed unit charges due for town communications. This may be done on meters allotted to the subscribers of the exchange, in which case tickets are made up by operators for toll communications. However, in automatic toll ticketing, it is necessary to provide for an automatic recording of the variable charges due for such communications. To this end, use has been made of an automatic bulk recording of toll charges on the same meters. However, such bulk recording suppresses all of the variable data informations (day, hour, called location etc.) which the operators record on the tickets. Therefore, the telephone company is no longer able to warrant the correctness of the invoices sent to the subscribers.

In a known system, successive items of partial information, relating to all communications, have been recorded "with the stream" on a common carrier. Each time an item is recorded it carries a reference which identifies the related communication. The common record stream of data must be later sorted to bring together all information items regarding each communication.

According to the invention, the record accounting system is designed for use in an automatic exchange which comprises:

1. incoming circuits having means for signalling characteristic conditions of the communications (such as engagement, communication running, end-of-communication etc.);

2. registers which connect themselves to incoming calling circuits for handling the wanted communications, and have means for recording initial information regarding such communications (such as identity and class-of-service of the call subscriber and identity of the called one);

3. charge indicators which enable the registers to complete the initial information by supplying other information relating to the rate-of-charge to be applied to the communication;

4. suitably programmed data-processing machines, each associated with a set of incoming circuits, and having means for a cyclic scanning of these circuits as to their signals, and 5. a transfer device for collating the initial information and the rate-of-charge from a register connected to an incoming circuit, to a processing machine associated with that circuit.

Each toll ticketing processing machine is provided with a time slot identified store cell assigned to each of the associated incoming circuits. In the time slots, the machine reaches each circuit in the course of its scanning cycle. In the cell assigned to that circuit, the machine records the initial informations and the rate of charge as transferred from the register. The successive informations derived from the signals received from that circuit are also recorded. The complete informations are transferred from the related cells to a recording office machine at the end of communications.

According to the invention, the system is more particularly designed to account for toll communications requested by subscribers, when the existing registers are not adapted to yield the rate of charge themselves. According to a feature of the invention, means are arranged to provide a central accounting for all subscribers by the network served.

The information processing machines are also provided, with a second set of cells, also assigned to the associated incoming circuit. These cells notice only the signal informations last received from the scanned incoming circuits. That information is compared with the preceding signal informations received from an incoming circuit. The informations contained in the associated cell only change responsive to a difference between the two signal informations.

Each incoming circuit is associated with only one processing machine. The transfer device is provided with connecting means so that only one register can seize this device at any given time. A register which has noticed the initial informations, is connected to a calling or incoming circuit. This information is completed with the rate of charge. The transfer device is adapted to send out to that circuit (namely, through the link path with that circuit) an accounting-wanted signal adapted to be received by the processing machine which reaches that circuit in its scanning cycle. The processing machines have means to receive, the initial informations, responsive to this signal and to store it in the store cell associated with that circuit. Storage is complete with the rate of charge, transmitted from the said register through the transfer device. The signal is stopped by the register, and the transfer device is freed by the same, responsive to the achieving of the transfer of the initial informations and the rate of charge.

In an embodiment of the invention, the transfer device comprises two transfer channels and connecting means such that two registers at a time can seize one channel each; the registers are provided with means for sending out either of two distinct accounting-wanted signals assigned to the two said channels; and the processing machines are provided with means adapted to receive in the store cell associated with a scanned incoming circuit the initial informations completed with the rate of charge that are transmitted through the channel seized by the register connected to that circuit, responsive to the accounting-wanted signal assigned to that channel and received through the said incoming circuit It shall be understood that the way the memory cells in the information processing machines are assigned to the associated incoming circuits is a fixed way. Such fixed way of assigning the cells avoids means or operations that would allot each time another free cell to a calling circuit and find again this allotment each time the machine would reach a circuit in condition of accounting. Owing to this fixed way of assigning the cells, the processing machines are simplified, which improves their real-time operation.

The handling of the informations noticed in the store cells comprises, namely, writing-in the hour of beginning and end of the communications by reference to a clock. The number of the junctor can be inferred from that of the associated cell in order to transfer it to the recording machine along with the other informations. The duration of the communications and the charges can be computed by the same processing machines and also transferred to the recording machine, yet with a view to simplify the real-time operation and shorten the scanning cycles, such computations can be deferred to the machines that will analyze the records for making up the subscribers' accounts.

The invention is further characterized in that there is provided a central electronic system for accounting telephonic communications in an automatic toll exchange, and using, on the one hand, the incoming junctors and registers comprised in the exchange and on the other hand, charge indicators and a plurality of real-time operating information-processing machines; these machines being provided with means for scanning the junctors as to the condition of the communications and with store cells adapted to store at least the initial informations (the identity of the communication), the rate of charge and the time of beginning; it being provided in this system that each cell is assigned to a junctor, so that each machine is associated with as many junctors as it has store cells; in that the registers are provided with means for registering the full identity of a communication (caller's identity and class-of-service, called subscriber's identity), other means for transferring a part of these informations to a charge indicator and then transferring the rate of charge to a coupler controlled by a selection circuit adapted to selectively connect any register to a free charge indicator; in that a transfer multiple is provided for transferring the initial informations completed with the rate of charge, to the processing machines, said multiple having access to the inlet registers of all these machines, a switch being provided, adapted to connect any register, yet only one at a time, to the said multiple; in that the registers comprise further means with detect, in each of them, the condition of the said switch having connected that register to the said multiple, the multiple being adapted to mark a wire in the preselection link between that register and the junctor to which it is connected, this wire being extended through that junctor so as to be accessible to scanning by the processing machine associated with that junctor; in that the said machines are also provided with means for transferring the said informations from the registers and through the transfer multiple, into their inlet registers and their cells assigned to the junctors scanned, when a machine detects that the said wire is marked from the transfer multiple; in that the said machines are further provided with means for modifying the informations noticed in the cells, according to the condition of communication stated in the junctors scanned, and namely, for writing-in the time of beginning and end of communication, and then with means for transferring the final informations regarding the ended communications, from the related cells into a peripheral recording office machine.

According to a further feature, means are provided for connecting, in case of need, a known incident-recording device, and for attempting a second transfer of informations toward a charge indicator and then toward the processing machines in using other paths than that of the first attempt; the incident-recording device being called again in case this second attempt also fails, after which the calling subscriber is busied.

The invention will be described more particularly in its application to a toll exchange, with reference to the appended drawings in which.

Figure 1:
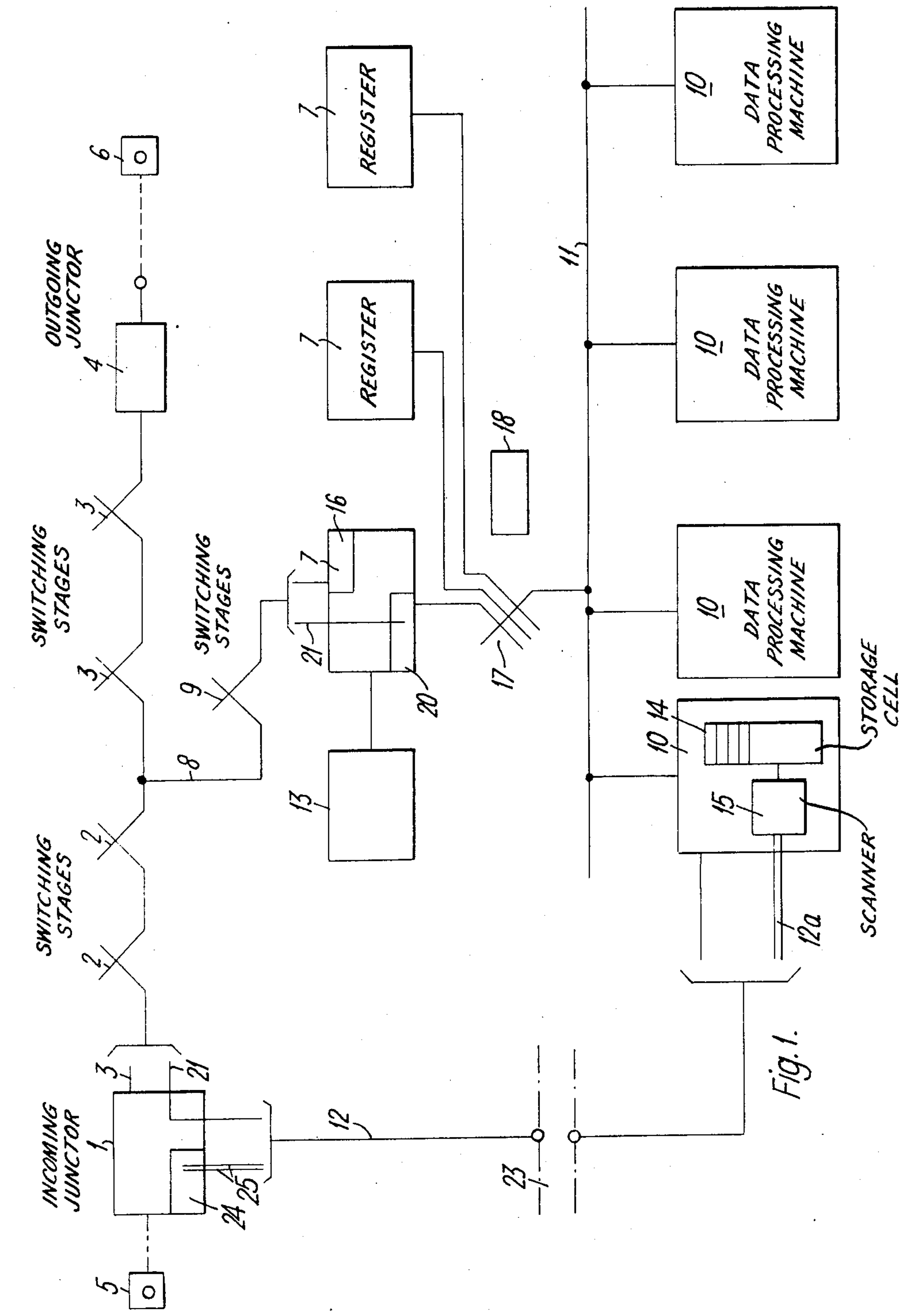
FIG. 1 is a trunk diagram showing a telephonic exchange equipped with an accounting system according to the invention.

It will be assumed that the toll exchange shown in FIG. 1 is an originating exchange in an exploitation area where the subscribers, —that will be callers here— are connected to a network of town exchanges. The exchange shown comprises, in its switching chain, incoming junctors 1, incoming switching stages 2, outgoing switching stages 3 and outgoing junctors 4. The calling subscribers' sets will be connected, for the purpose of their toll communications, to incoming junctors 1, and outgoing junctors 4 will set the communication on its way to the called sets 6 located in another exploitation area. The routing is controlled by registers 7 which will be connected to incoming junctors 1 through a preselection chain comprising here switches 2, a branch 8 and a switching stage 9.

For the purpose of the recorded accounting, the exchange is provided with suitably programmed information processing machines 10. These machines receive all useful informations regarding the communications asked for, on the one hand, by a transfer of the initial informations noticed in the registers and the rate of charge yielded by the charge indicator, through a transfer multiple 11, and on the other hand, by a cyclic scanning of the incoming junctors through a scanning bundle 12. In order to determine the rate of charge, the register links himself with a charge indicator 13. The junctors supply signal informations on the successive conditions of the communications. Each set of such junctors 1 is associated with a single processing machine 10. Informations regarding the communications are noticed in a store which comprises as many cells 14 as there are junctors associated with this machine, each cell being assigned to a junctor. A cyclic scanning device 15 scans cells 14 in synchronism with junctors 1 scanned through their groups of wires **12*a***. The informations are noticed in a cell assigned to a junctor, modified, completed or otherwise handled in the moment the junctor and its associated cell are reached in the course of the scanning cycles.

The registers notice the initial informations by means diagrammatically shown in 16. These informations must define the communication for the purpose of accounting and comprise, namely, the identity and class-of-service of the caller, the identity of the called subscriber and the class of the junctor, which however is only noticed for the purpose of recording it in case of an incident.

Each register 7 will be linked to either of two charge indicators provided in the exchange, by means of a connecting circuit controlled by a selecting circuit. The data required for determining the rate of charge, i.e. the code digits of the caller, its class-of-service and the code digits of the called subscriber, are transmitted to the charge indicator. The latter replies in giving out the rate of charge in the form of a two-digit number which is stored in the coupler 26.

Any register, yet one at a time, can be connected to the transfer multiple 11 by means of a switch or "coupler" 17 controlled by a "tester" device 18 of a known kind and which receives the calls from the registers, checks that the multiple 11 is free and connects a calling register to said multiple, proceeding with a selection when there are several calling registers. The transfer multiple 11 is multipled on the processing machines 10.

The register when it has noticed the initial informations and the rate of charge and seized the transfer multiple states this condition with means 20 which then apply an accounting-wanted marking to a wire 21 which extends to junctor 1 through the preselection link. This wire goes through the junctor and is comprised then in the group of wires 12.a scanned by device 15. When the junctor wherein the accounting-wanted wire 21 thus marked is reached by the scanning device of the processing machine associated with this junctor, the said device orders the transfer of the initial informations and rate of charge from multiple 11 to the cell 14 assigned to this junctor.

The following informations regarding the communication asked for will be received by the scanning device from the junctor. To this end, the junctor comprises means of a known kind, diagrammatically figured in 24, which notice the condition of the communication and signal them to the scanning device by marking wires 25 in group **12*a*. In fact, these conditions are but three: junctor free, junctor busy, conversation, and they are signalled on two wires 25**. It may be assumed that the transfer of the initial informations and rate of charge from the registers to the processing machines is achieved by a parallel binary marking on the wires of the transfer multiple.

The junctors are arranged in groups for the purpose of their association with the processing machines by means of a distributing frame 23 through which the scanning bundles 12 are led.

In practice, a direct connection from the registers to the charge indicators would entail too heavy modifications of the existing registers. Therefore, it is more convenient to place a coupler circuit 26 between switch 17 and transfer multiple 11, as shown in FIG. 2, said coupler 26 providing a link device between the registers, the charge indicators 13 and the transfer multiple or multiples 11.

The coupler circuit 26 connects itself to the transfer multiples through a connection device 28 (e.g. a relay device) controlled by a tester 29 which provides a selection when both transfer multiples **11*a* and 11*b*** are free.

Wire 21 is then extended through register 7 and coupler 26 and ends in the transfer multiple which is connected to the register and where a distinct marking characteristic of that transfer multiple (e.g. one of two opposite-polarity markings) is applied to this wire. The processing machine detects the marking applied and causes the initial informations and rate of charge to be transferred to it from that of the two multiples from which this marking is applied.

Figure 2:
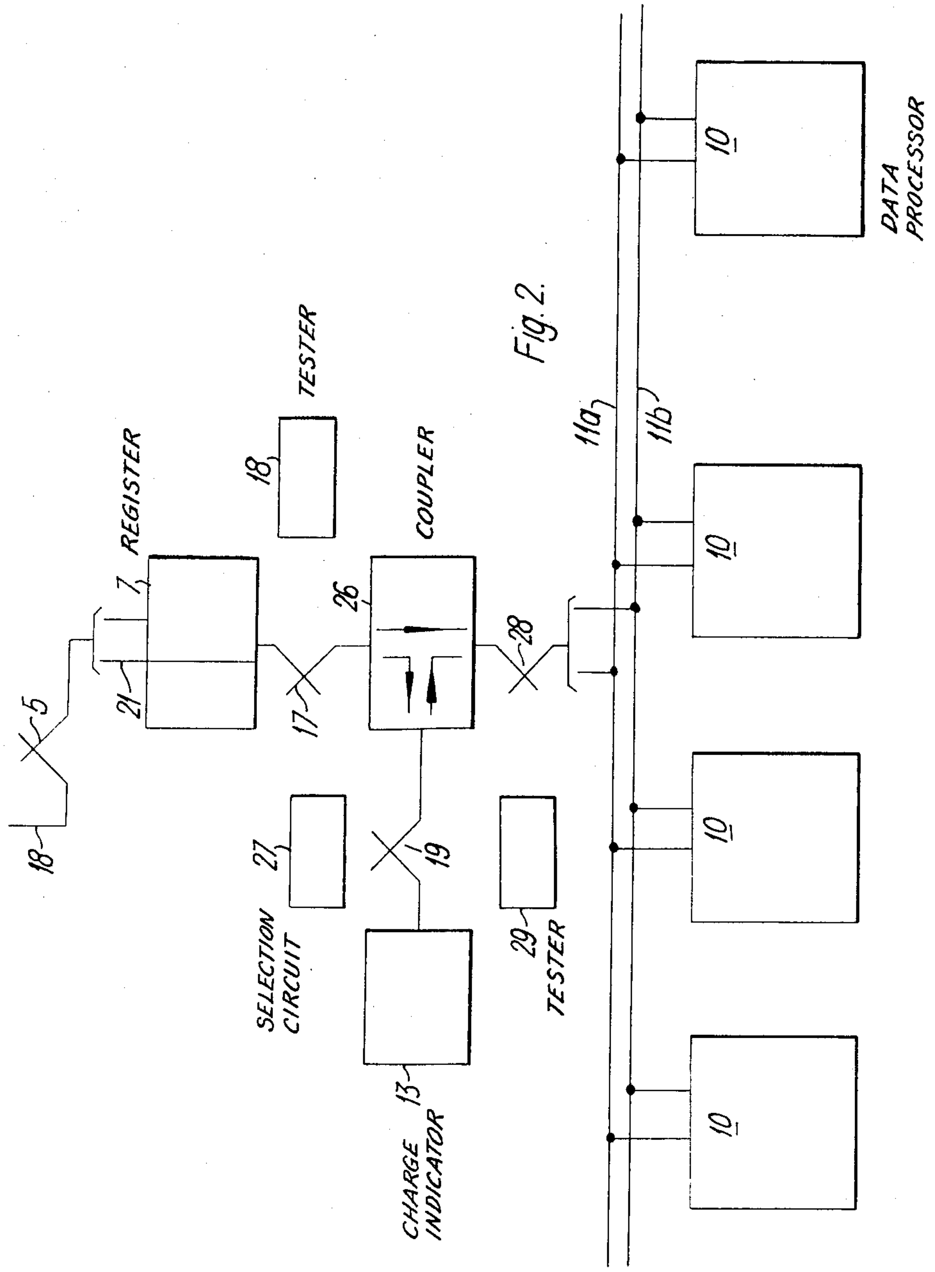
FIG. 2 represents, in the diagram of FIG. 1, the relations achieved between the registers, charge indicators and transfer multiples in an embodiment of the invention.
Figure 3:
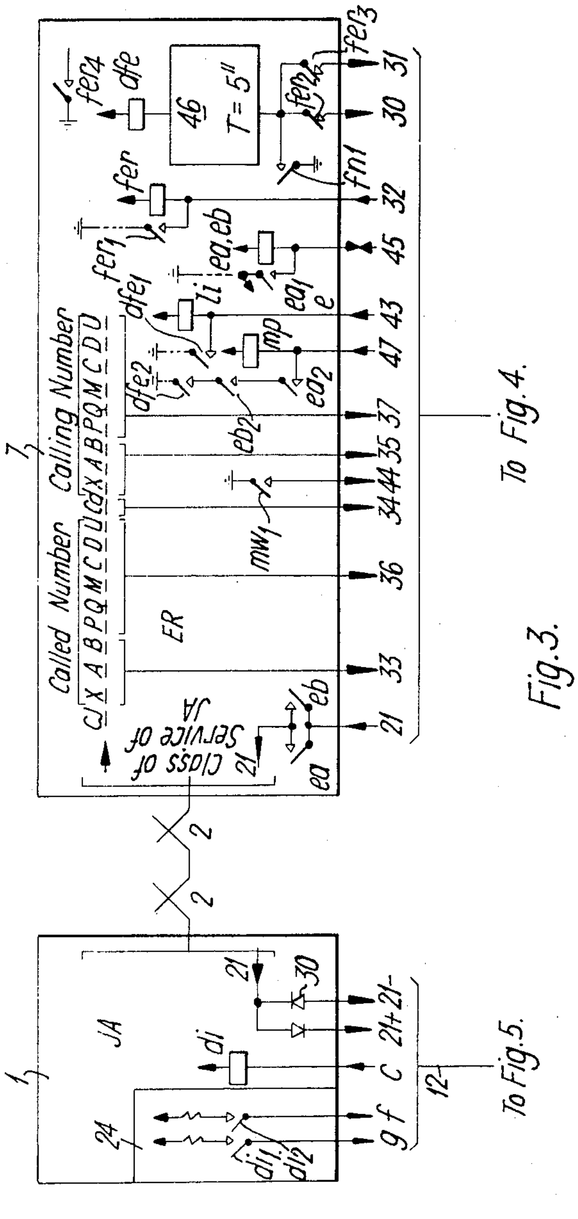
FIG. 3 shows items in a junctor and a register, concerned with the transmission of the elements required for making up a rate of charge, in accordance with the embodiment of FIG. 2.
Figure 4:
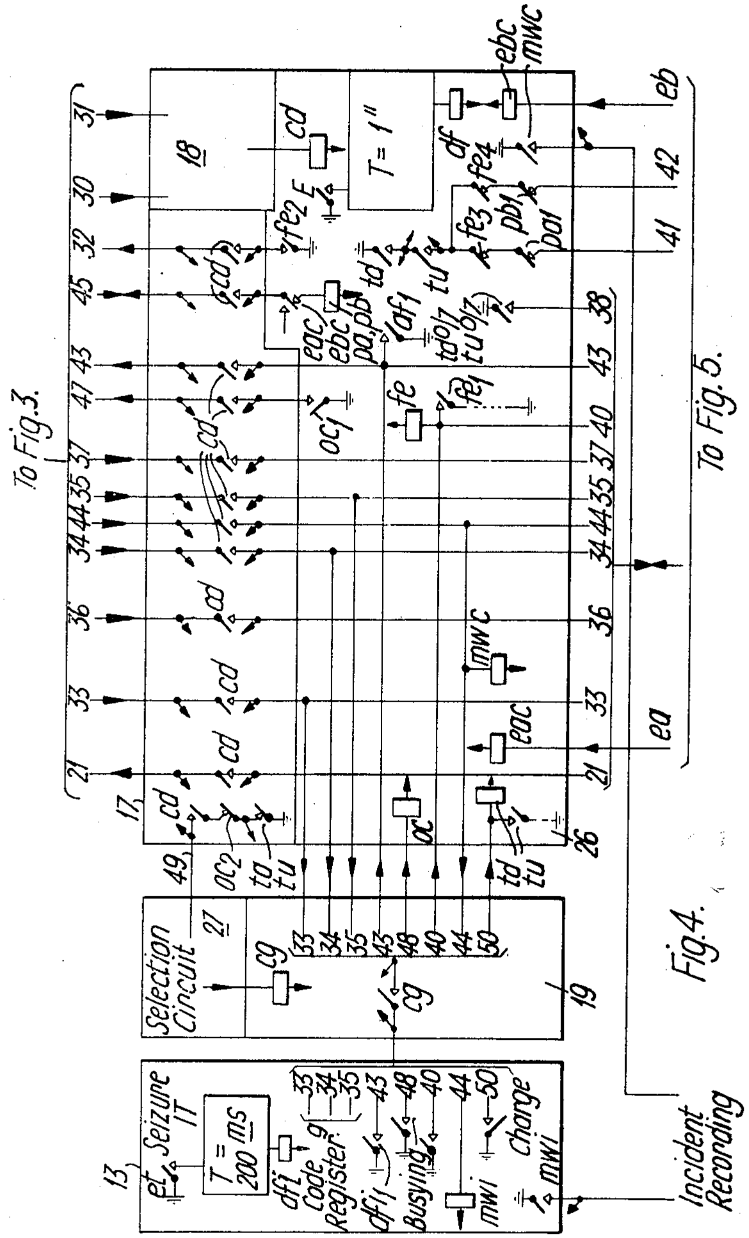
FIG. 4 shows the particulars of a charge indicator, its connector and a charge coupler, in accordance with the embodiment of FIG. 2.

FIGS. 3 and 4 show more in detail the embodiment of FIG. 2 and the various circuits implied in the transfer of the informations to be registered for the purpose of accounting a communication.

FIG. 3 shows the parts of junctor 1 and register 7. When the register has received the initial informations, i.e. the called number and the number and class-of-service of the caller, it starts the operations of a connection to a charge indicator. Contact *fn*1 of an end-of-dialling relay (not shown) completes wires 30, 31 which supply the tester 18 (FIG. 4) which control connectors 17 in the coupler circuits 26 associated with a group of registers. After one of the connectors is selected by circuit 18, connecting relay cd in the coupler is operated and completes the wires which connect coupler 26 to the calling register 7.

The selection circuit 27 for the two charge indicators 13 in the exchange is then supplied by a contact of relay *cd* and a wire 49. After a charge indicator has been selected, a connecting relay *cg* therein is operated, and the indicator can receive the initial informations from the register through wires 33, 34, 35. The arrowheads on these wires show the direction of the flow of information.

Figure 5:
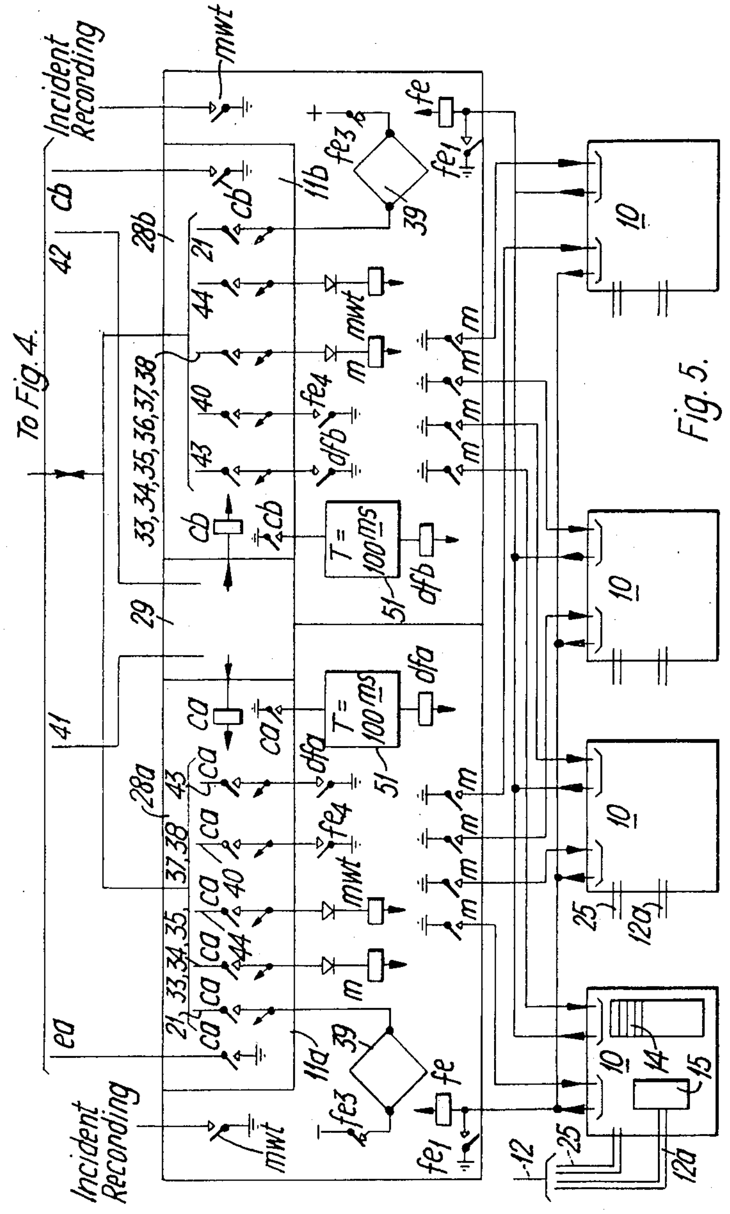
FIG. 5 represents two transfer multiples, their selection circuit and four out of a set of central accounting units (ETC).

The charge indicator 13, which operates as a translator, replies on wires 50 by a two-digit number (tens and units), in a two-out-of-five code, which operates corresponding relays *td* and *tu*. These relays hold themselves by a front contact, while by a back contact they release the charge indicator selection circuit. A series combination of contacts of the operated relays *td* and *tu* supplies, through back contacts of *fe*, *pa* and *pb*, and wires 41, 42, the selection circuit 29 of the two transfer multiples 11*a* and 11*b* (FIG. 5). Assuming that multiple 11*a* is selected, relay *ca* is operated and completes by its contacts the wires which connect the multiple to coupler 26. Relays *m* receive the informations which must be transferred to the information processing machine ETC: the caller's number and class-of-service (wires 34, 35, 37), the called subscriber's number (wires 33 and 36) and the rate of charge to be applied (wires 38).

A check of the received informations is operated in a well known manner by a combination of contacts of relays *m* diagrammatically represented at 39. After having received the above mentioned informations this contact combination applies a polarity to wire 21 which extends toward the ETC which is associated with the junctor that serves the call, through coupler 26, register 7 and junctor 1. In order to distinguish the seized transfer multiple, this polarity will be negative in 11*a* and positive in 11*b*. This polarity is applied to wire 21, which extends into coupler 26 (FIG. 4), by a front contact of connecting relay *ca* of 11*a*, said wire being further extended by a contact of connecting relay *cd* in the seized coupler, then, in the register 7, by a contact *ea* or *eb* depending from the coupler which serves the call, and last in junctor 1, through a rectifier 30, to a wire 21 toward the ETC in question. When the scanning device 15 comes on the position of this junctor, ETC enters the informations supplied by the *m*-relays in the transfer multiple 11*a*.

As soon as this registering is completed, ground potential is applied by ETC towards end-of-transfer relay *fe* in the transfer multiple 11*a*. This relay locks itself by its contact $fe_1$, it breaks wire 21 by its contact $fe_3$ so as to cut the bound with the ETC, and by its contact *fe*4 it completes wire 40 towards relay *fe* in coupler 26 (FIG. 4). This relay locks itself and by its contacts $fe_3$ and $fe_4$ breaks wires 41 and 42 toward the selection circuit 29 (FIG. 5). Relay *ca* resets and releases the transfer multiple 11*a*. In coupler circuit 26, relay fe completes wire 32 for operating end-of-transfer relay *fer* in register 7. This relay locks itself by its front contact $fer_1$; by its contacts $fer_2$ and $fer_3$, it breaks the starting and holding wires 30 and 31 toward selection circuit 18 of FIG. 4, and by its contact fer.4 enables the switching selections to be started, or any other characteristic action which will secure that the accounting data have been effectively transferred before the register will be released.

In case of a cell sent out by an operator, and which is not to be charged, the various circuits are released as soon as the charge indicator has ascertained the origin of the call. At this time, charge indicator 13 connects a ground on wire 40 to operate relay *fe* in coupler 26. This relay opens its contacts $fe_3$ and $fe_4$ which release the seized transfer multiple (either 11*a* or 11*b*). Like in the former instance, relay *fe* by its contact $fe_2$ connects ground to wire 32 which operates relay *fer* in the register. The latter causes coupler 26 to be released and enables the selection toward the called number to begin.

Special precautions have been taken to ensure the transmission of the charges despite any possible failure of a part. Therefore, when the seizure of a device exceeds a given time, a timing circuit interferes and allows a second attempt of transmission to be made from the register.

It can be assumed e.g. that the check of the informations received by the transfer multiple did not allow wire 21 to be completed. The sequence of operations is thus broken. After a given, yet relatively short time, 100 milliseconds e.g., relay *dfa* or *dfb* is operated by a timing circuit 51. A front contact of this relay completes a wire 43 which extends through coupler circuit 26 (FIG. 4) and operates relay li in register 7 (FIG. 3). This relay calls an incident-recording circuit, not shown, which connects itself to the register and operates a relay *mw*, not shown. A contact *mw*1 connects ground to a wire 44 which, on the one hand, extends through the coupler (FIG. 4) and, on the other hand, operates relay *mwi* in charge indicator 13 by a branch thereof. Relay *mwt* is also operated in transfer multiple 11*a* (FIG. 5) through wire 44. The particulars of the incident are then signalled to the recording circuit by contacts of *mwt* (in 11*a*, FIG. 5), *mwi* (in 13, FIG. 4) and *mwc* (in 26, FIG. 4). When the record is completed, the incident-recording circuit disconnects itself, which causes the circuits engaged in the transmission to be released, except the junctor and the register (which arrangement is not shown but can be easily imagined by the artsman, e.g. by momentary breaking the ground connected in the register by contact *fn*1). The call for transmission circuits and for that ETC which serves the calling junctor is renewed through wires 30 and 31. This time, however, relay ea stands operated and locked in the register, and relay *pa* will be operated in coupler circuit 26. Relay *ea*, which characterizes the transfer circuit seized in the first attempt, was operated and stands locked since the seizure of the transmission which was followed by the incident recording. Relay *pa* is then operated as soon as coupler 26 is seized in the renewed call from the register: through a front contact of connecting relay *cd* in coupler 26, which completes wire 45 toward the locking ground of relay *ea*, on the one hand, and on the other hand, through a back contact of relay *eac*. Transmission of the informations required for accounting to the charge indicator takes place like in the former instance, and as soon as a combination of relays *td* and *tu* has been operated, transfer multiple 11*b* is engaged by: contacts of *td* and *tu* in series, back contact $fe_4$ back contact *pb*1 and wire 42 toward circuit 29. Since wire 41 is broken by back contact *pa*1 in work position, relay *cb* (FIG. 5) is operated, and the call is now served by multiple 11*b*, which cause relay *eb* to be operated in register 7.

In case the transfer to ETC fails again, relay *dfb* is operated by the timing circuit 51 of transfer multiple 11*b*. It connects ground to wire 43 which operates relay *li* in the register. Then, incident-recording relays in all circuits (*mw, mwc, mwi, mwt*) are operated. A renewed recording takes place, which can be compared with the first one to determine whether there is a faulty circuit or a fault in the transmission of informations. Register 7 then resumes its call condition but this time relays *ea* and *eb* stand both operated. Relays *pa* and *pb* in coupler 26 will be both operated, breaking call wires 41 and 42 toward the transfer circuits. As no transfer multiple will be connected, timing circuit 46 in register 7 will operate and supply relay *dfe*. Relay mp will be operated through front contacts *dfe*2, *eb*2 and *ea*2 and it will apply the busy condition to the calling subscriber.

It will be noted that each circuit is provided with a timing circuit, and that recording an incident can be caused by any circuit: relay *li* in the register is connected through wire 43 to a front contact of relay *dfe* in register 7 (FIG. 3), to a front contact of relay *df* in coupler circuit 26 (FIG. 4), to a front contact of relay *dfi* in charge indicator 13 and to front contacts of relays *dfa* and *dfb* in transfer multiples 11*a* and 11*b* (FIG. 5).

On the contrary, relay *mp* in register 7 and which causes a busy condition to be applied to the calling subscriber can only be operated in case of jamming after recording two successive incidents, through contacts *dfe*2, *eb*2, *ea*2 or through wire 47 when ground is applied to it by relay *oc* in coupler 26. This relay is operated through wire 48 to which ground is applied in charge indicator 13 when e.g. the latter receives unutilized code digits that could not be analyzed in the originating exchange.

We claim:

1. A toll ticketing and accounting system for an automatic telephone exchange which comprises a plurality of incoming circuits, each capable of producing signals representative of characteristic conditions of calls, from a circuit,registers, means responsive to the initation of a call from an incoming circuit for connecting a register to the incoming circuit for registering the initial information items regarding the call, charge indicators, means for connecting a register to a charge indicator for receiving therefrom information as to the rate of charge to be applied to the call, means comprising a transfer device for transferring the initial information items and the rate of charge from said register to a processing machine associated with the incoming circuit, means comprising at least one programmed data processing machine associated with said incoming circuits to receive said information items, channels in said machine individually associated with each incoming circuit for recording in each channel information from its associated circuit and means for cyclically scanning said incoming circuits to continuously detect signals therefrom for recording in said channels, wherein each incoming circuit is associated with only one processing machine, and said transfer device comprises connecting means whereby connection to only one register can be made at any given time, means for storing the initial information items of a call in a register which is connected to a calling incoming circuit, which has received from the charge indicator circuit the rate of charge to be applied to the call and which has seized the transfer device, means comprising a preselection link for transmitting an accounting-wanted signal to that incoming circuit through the information data-processing machine which reaches that incoming circuit in the course of its scanning cycle, and means in the processing machine operated responsive to said signal for entering the initial information and the rate of charge, as formed in said register and transmitted by the transfer device, said entry being made in a store cell associated with said incoming circuit, and means in the register for stopping said signal and releasing the transfer device responsive to the transfer of the said information being achieved.

2. The system according to claim 1, characterized in that the transfer device comprises two transfer channels with means for connecting two registers to a channel at a time, means for transmitting to the incoming circuit either of two distinct accounting-wanted signals, each signal being assigned to a channel in the transfer device, and means in the processing machines for entering the initial information items and the rate of charge in the store cell associated with a scanned incoming circuit.

3. The system according to claim 1, comprising means including the incoming junctors, and charge indicators and, a plurality of real-time information data-processing machines, said machines having means for scanning the junctors to detect the condition of the communications, and means comprising store cells in each machine being not less than the number of the junctors, multiplies by the number of these machines.

4. A toll ticketing system including register means, for temporarily recording information concerning a call in process, means for transferring information from said register means, data processing equipment receptive of said transfer information for receiving and storing said information from said register for retention for the duration of said call, an incident-recording device connectable to the path of a call on completion of transfer of said information, means responsive to a failure of completion of said transfer to initiate a second attempt to connect an incident-recording device to said path, and means responsive to a second failure to connect an incident recording device to said path for applying a busy condition to the call path.

* * * * *